United States Patent Office 3,326,888
Patented June 20, 1967

3,326,888
QUINOXALINE DYESTUFFS
John Elton Cole, Jr., and William Henry Gumprecht, Wilmington, Del., assignors to E. I. du Pont de Nemours and Company, Wilmington, Del., a corporation of Delaware
No Drawing. Filed May 2, 1963, Ser. No. 277,444
4 Claims. (Cl. 260—154)

This invention relates to compositions of matter useful as reactive dyes for materials possessing in their structure exchangeable hydrogen atoms. More particularly, this invention deals with dyes for textile fibers and similar organic materials (including paper, leather, plastic film, etc.) which possess in their molecules or micelles reactive radicals such as OH, NH, or $NH_2$. Common illustrations of such materials are cellulosic fiber, wool, silk, nylon fiber, and polyvinyl alcohol film.

According to the present invention, new chemical compounds are produced which may be used as reactive dyes on fiber or other organic material as aforementioned. These new chemical compounds may be expressed by the general formula

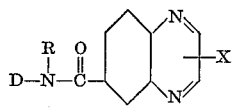

wherein D is the radial of a water-soluble dye chromophore, particularly of an azo, metallized azo, acid-anthraquinone, or phthalocyanine coloring matter which is attached to the N-atom by cyclic substitution, and R is hydrogen, a lower alkyl radical (say, 1 to 4 C-atoms) or a 2-hydroxyethyl, 2-cyanoethyl, or 2-sulfatoethyl radical (free acid or water-soluble salt); and X is Cl or Br.

The novel dyes of this invention are prepared in a number of ways, illustrated by the following: (1) By reacting a water-soluble amino-dye base of the formula D—NHR, wherein D and R have the same meaning as above, with a carbonyl halide of the structure

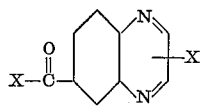

wherein X is Cl or Br. The reaction is achieved by bringing the two reactants together in aqueous media or in an aqueous organic solvent (e.g., the xylenes or a chlorobenzene) mixture and in the presence of an acid acceptor such as an alkali-metal carbonate, an alkali-metal hydroxide, or an alkali-metal phosphate. The temperature for this reaction is generally between room temperature and 100° C., and the pH is between about 6 and 10. The reaction product is recovered by salting out, using sodium chloride or sodium sulfate, and filtering; (2) By reacting an aryl diamino dye component for an azo dye with a monohalogeno-6-quinoxalinecarbonyl halide followed by diazotization and coupling; (3) By reacting an amino-containing azo dye coupling component with a monohalogeno-6-quinoxalinecarbonyl halide followed by the coupling reaction. Alternatively, in procedure (2) either a primary or a secondary amine having the formula

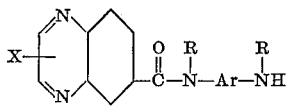

where X and R have the meanings specified above and Ar is an aryl group, may be condensed with a phthalocyanine sulfonyl halide to provide the fiber-reactive dyes of this invention.

The monohalogenoquinoxalinecarbonyl halides used in this invention may be prepared by the action of a phosphorus pentahalide or oxyhalide on the corresponding monohydroxyquinoxaline carboxylic acid.

The application of our novel dyes to organic material which possesses OH, NH, or $NH_2$ groups is done from aqueous media, and may be effected by several procedures such as padding, exhaust, printing or (in the case of azo dyes) by development on the fiber. All these procedures involve at one stage or another treatment of the fabric also with an aqueous alkali solution. For instance, in padding, two separate baths may be employed, whereby the fabric is first padded in a dyebath, then dried and padded in an alkaline bath; or the dye and alkali may be added to the same bath, whereby the fabric receives but a single padding treatment.

In any of the above-mentioned methods, the step of treating with alkali may be followed by batching (allowing the treated fabric to stand at ambient temperature) or by a heating step. Since the monohalogenoquinoxalinecarbonylamino dyes of this invention are quite stable toward hydrolysis, they are particularly well adapted to applications which employ higher temperatures and/or relatively strong acid acceptors. The heating step may involve steaming after the alkaline treatment, with or without an intermediate drying procedure; dry heating (as on a heated drum) after the alkaline treatment, with or without intermediate drying; heating the alkaline bath itself (which may or may not contain dye) at elevated temperature (50° to 100° C.).

In exhaust technique, the alkaline agent is introduced into the dyebath either before or after exhaustion of the dye on the fiber. Exhaustion of the dye is achieved by the addition of electrolyte, such as NaCl or $Na_2SO_4$.

In printing procedures, the alkali is generally incorporated in the printing paste, and the printed fabric is dried and heated.

When the dye is developed on the fiber, the alkaline and heating treatments are applied to the fiber after impregnation with the dye component which carries the monohaloquinoxalinecarbonyl radical, but before application of the further treatments necessary to develop an azo dye on the fiber.

The alkaline agents usable for the above purposes are of the same general class as normally used in dyeing with fiber-reactive dyes. Sodium carbonate and sodium hydroxide are the agents most commonly used, and the degree of alkalinity required is typified by a 2% aqueous solution thereof.

In forming the dyebath for padding or exhaustion, urea or other agents may be added. In some cases, a concentrated aqueous solution of the dye may be prepared first, which is then diluted to a bath of the desired strength, or, in the case of printing, is incorporated in the printing paste.

In all the above procedures, the novel dyes of the invention are found to give both rapid and high fixation, and the dyeings obtained are characterized by good fastness to light and to washing.

When the novel dyes of this invention are applied to wool and nylon by the ordinary dyeing procedures recognized for these fibers, that is, from a hot, dilute acidic bath as is customary in the art of dyeing with acid dyes, attractive dyeings are obtained.

For a clearer understanding of the invention, the following specific examples are given. These examples are intended to be merely illustrative of the invention and not in limitation thereof. Unless otherwise specified, all parts are by weight.

Part I.—Preparation of 2 (and 3)-halo-6-quinoxalinecarbonyl halides

EXAMPLE I (a) *3-chloro-6-quinoxalinecarbonyl chloride.*—20 parts of 3-hydroxy-6-quinoxalinecarboxylic acid (prepared from the reaction of 3,4-diaminobenzoic acid sodium salt in aqueous ethanol with n-butyl glyoxalate) are suspended in 210 parts of ethyl acetate and 1.5 parts of dimethyl formamide and heated to reflux. At this temperature, 32 parts of phosgene are passed through the slurry in period of 4 hours to give a clear solution and a small amount of black tar on the sides of the container. The clear solution is then removed from the reflux vessel and evaporated under reduced pressure. After cooling, there results 21.5 parts of cream-colored 3-chloro-6-quinoxalinecarbonyl chloride, M.P. 120–122° C.

Calcd. for $C_9H_4ON_2Cl_2$: C, 47.6; H, 1.78; N, 12.34; Cl, 31.2. Found: C, 48.2; H, 2.0; N, 12.4; Cl, 30.3.

(b) *2 - chloro-6-quinoxalinecarbonyl chloride.*—When 20 parts of 2-hydroxy-6-quinoxalinecarboxylic acid (see Example II(c)) is used in the procedure set forth above in lieu of the 3-hydroxy isomer, the 2-chloro-6-quinoxalinecarbonyl chloride, M.P. 127°–129° C., is obtained.

EXAMPLE II (a) *2 (and 3)-hydroxy-6-quinoxalinecarboxylic acids (mixture).*—A pressure vessel is filled to about 60% of capacity with a mixture consisting of 40 parts of 2-hydroxy-6 (and 7)-methylquinoxalines (prepared from the condensation of 3,4-diaminotoluene and butylglyoxalate), 160 parts of glacial acetic acid, 1.5 parts of cobalt acetate tetrahydrate, 1.5 parts of manganese acetate tetrahydrate and 3.0 parts of 48% aqueous hydrobromic acid. Oxygen gas is introduced into the vessel until a pressure of 300–400 p.s.i.g. is reached. While agitating the contents of the vessel continuously, the mixture is heated to about 160° C. at which time an exothermic reaction ensues. This is followed by a rapid drop in pressure. More oxygen is introduced into the vessel until the pressure becomes constant at 300 p.s.i.g. while maintaining the temperature at 160°–165° C. The reaction is completed in about 2.5 hours, after which the reaction mass is cooled. The reaction product, a mixture of 2-hydroxy-6-quinoxalinecarboxylic acid and 3-hydroxy-6-quinoxalinecarboxylic acid, is isolated by filtration, washing, and drying.

(b) *2 (and 3)-chloro-6-quinoxalinecarbonyl chlorides.*—Eight (8) parts of the acid mixture of the preceding paragraph are slurried with 0.4 part of dimethylformamide in 24 parts of p-xylene, and the slurry is heated to 110° C. At 120°±10° C. are added, over a 5-hour period, or until a clear solution results, 10 parts of phosgene. The clear solution is transferred to a distillation unit, and the solvent is removed by distillation under vacuum at 120° C. The mixed 2-chloro (and 3 chloro)-6-quinoxalinecarbonyl chlorides, B.P. 150° C./0.6 mm., are fractionally crystallized from cyclohexane to afford the pure components; 2-chloro - 6 - quinoxalinecarbonyl chloride, M.P. 127°–129° C. and 3-chloro-6-quinoxalinecarbonyl chloride, M.P. 120°–122° C., as shown by analyses.

(c) *Preparation of the pure hydroxy acids.*—The pure 2,6 and 3,6 isomeric chlorocarbonyl chlorides, prepared in part (b) of this example, are heated in dilute aqueous sodium hydroxide at 95°–100° C. to effect hydrolysis of the chlorine atoms. The hydroxy carboxylic acids are precipitated by acidification with HCl, separated by filtration, washed, and dried under high vacuum at 160° C., giving, respectively, the pure 2-hydroxy-6-quinoxalinecarboxylic acid and 3-hydroxy-6-quinoxalinecarboxylic acid.

The same pure carboxylic acids result when one starts with either the pure 2-hydroxy-6-methylquinoxaline or the 3-hydroxy-6-methylquinoxaline in the oxidation procedure described in part (a) of the present example.

EXAMPLE III

*2 (and 3)-bromo-6-quinoxalinecarbonyl bromides.*—20 parts of 2-hydroxy-6-quinoxalinecarboxylic acid are added to a mixture of 60 parts of phosphorus pentabromide and 40 parts of phosphorus oxybromide. The agitated slurry is heated to 110°–120° C. and the reaction is continued at this temperature for 3 to 4 hours. The reaction mass is then cooled and poured into 300 parts of water which is maintained at 25°–35° C. by the addition of ice. The solid is filtered off, dried below 40° C., and recrystallized from cyclohexane, to yield pure 2-bromo-6-quinoxalinecarbonyl bromide.

The 3-bromo-6-quinoxalinecarbonyl bromide is made in the same way, starting with 3-hydroxy-6-quinoxalinecarboxylic acid. A mixture of the 2- and 3-bromo-6-qiunoxaline carbonyl bromides is obtained by employing in the process of the present example 20 parts of the mixture of 2- and 3-hydroxy isomers obtained in part (a) of Example II.

In an alternate procedure, the above bromoquinoxalinecarbonyl bromides are prepared by reacting the corresponding hydroxyquinoxalinecarboxylic acids with POBr₃ in the presence of a carboxamide catalyst such as dimethylformamide.

Part II.—Prepartion of reactive dyes

EXAMPLE IV

Three parts of the red-yellow dye base of the structure

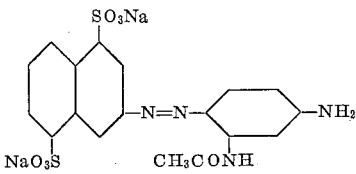

are dissolved in 250 parts of water at 45°–50° C. and pH 5–6. The pH is maintained in this range with a trisodium phosphate solution over a 20-hr. period while 2 parts of finely powdered 3-chloro-6-quinoxalinecarbonyl chloride, M.P. 120–122° C., are slowly added to the agitated reaction mass. The solution is then clarified by filtration, salted with sodium chloride, and the precipitated dye of the structure

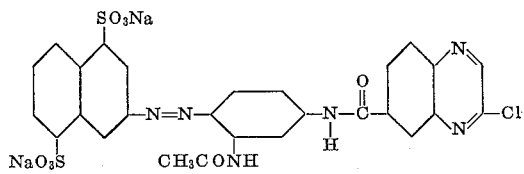

is filtered and dried. When this dye is exhausted from its 2% aqueous solution onto cotton skeins in the presence of sodium sulfate and sodium carbonate at 140° C. there results a bright yellow dyeing which is fast to light, wash, and acid perspiration.

EXAMPLE V

The exact procedure of Example IV is employed except that in place of the 3-chloro-6-quinoxalinecarbonyl chloride one employs 2 parts of 2-chloro-6-quinoxalinecarbonyl chloride, M.P. 127°–129° C. There results a dye of the structure

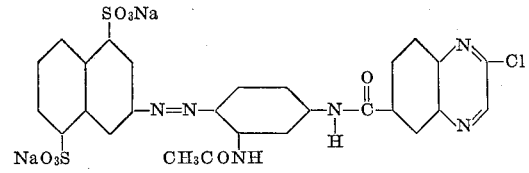

which, when padded onto cotton broadcloth at 40 g./l. with 20 g./l. of sodium carbonate, then heated to dryness during 60 sec. at 306° F. and washed, affords a bright yellow washfast dyeing.

A bright yellow print results when this dye is printed from an alkaline printing paste and heated by direct heat or steam.

EXAMPLE VI 31.9 parts of 8-amino-1-naphthol-3,6-disulfonic acid (H acid) are dissolved in 2000 parts of water, followed by the addition of 15 parts of sodium formate, 24.1 parts of finely powdered 3-chloro-6-quinoxalinecarbonyl chloride are then added and the condensation mass is agitated for 4 hours at 25°–30° C. and at pH 4–5 (held constant by the addition of sodium hydroxide). The greenish brown solution is clarified by filtration and then salted with sodium chloride. The brownish precipitate is filtered and redissolved in 2000 parts of water at pH 7.2 (using sodium hydroxide). To this solution are added 60 parts of sodium bicarbonate and, over 1 hour, a solution obtained by diazotizing in 600 parts of water, 17.3 parts of orthanilic acid with sodium nitrite and hydrochloric acid. The resulting red solution is salted with sodium chloride, filtered, and the product is washed. The resulting red dye of the structure

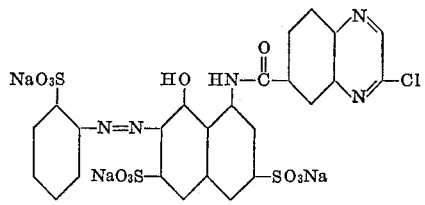

when applied to cotton fabric as follows gives a lightfast and washfast dyeing. (a) Pad the fabric with a solution of 40 parts of dye and 1000 parts of water, (b) dry, (c) pad the dried fabric with a solution of 250 parts of sodium sulfate and 5 parts of sodium hydroxide in 1000 parts of water, (d) steam the wet fabric for 60 sec. at 218° F., and (e) wash and dry.

A stronger dyeing results when one employs in place of the steaming step a curing step wherein the fabric is heated for 90 sec. at 325° F.

When one uses in place of the 3-chloro-6-quinoxalinecarbonyl chloride of this example equal molar amounts of the 2 (or 3)-bromo-6-quinoxalinecarbonyl bromide, there results dyes of similar shade, application, and fastness properties.

EXAMPLE VII 50 parts of the dye base prepared by coupling 2-amino-p-benzenedisulfonic acid with acetyl H acid followed by hydrolysis are dissolved in 500 parts of water at pH 7.5. To this red solution are added 24 parts of 3-chloro-6-quinoxalinecarbonyl chloride dissolved in 60 parts of xylene. The resulting two-phase system is vigorously stirred at 25°–30° C. and pH 7.5–8 (maintained with sodium carbonate solution) for 4 hours, clarified by filtration, and salted with sodium chloride. The precipitated dye is removed from the xylene-water medium by filtration, washed, and dried. The resulting red dye has the structure

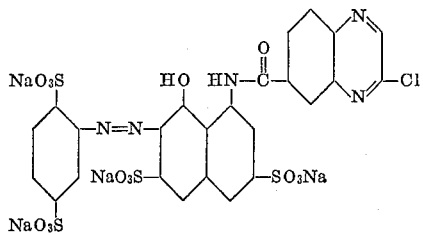

and has properties similar to those of the dye prepared in Example VI.

EXAMPLE VIII

*Preparation of the diazo solution.*—3.6 parts of 2,4-diamino-benzenesulfonic acid are dissolved in 100 parts of water. 4.5 parts of 2-chloro-6-quinoxalinecarbonyl chloride are then added at 20° to 25° C. and pH 7 to 8 over a period of 4 hours. The resulting solution is cooled to 5° C., and the pH is adjusted to 5.2 by addition of 2 N hydrochloric acid. The condensation product thus obtained is diazotized in the usual manner with hydrochloric acid and sodium nitrite, at 5° to 10° C. After stirring for 1 hour at 5° to 10° C., the excess nitrite is destroyed. The pH is then adjusted to 5.1 with an aqueous solution of sodium bicarbonate.

*Preparation of coupling component and coupling step.*— 5.4 parts of 6-acetamido-1-naphthol-3-sulfonic acid are dissolved in 100 parts of water. The pH of the solution is adjusted to 7.2 with a solution of sodium bicarbonate, followed by the addition of 4 parts of sodium bicarbonate. The above-mentioned diazo solution is stirred into the solution of coupling component, at room temperature, to give a bright orange colored solution. Upon addition of sodium chloride (sufficient to form a 20% salt solution) an orange precipitate is obtained, which is filtered off, washed with 20 parts of 15% sodium chloride solution, and dried. The product corresponds to the formula

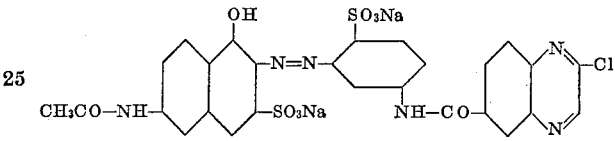

When applied to cotton by any of the above procedures, it produces bright orange dyeings which exhibit excellent fastness to light and to washing.

When the above procedure is repeated except that the 2,4-diaminobenzene-sulfonic acid is replaced by 3.6 parts of 2,5-diamino-benzene-sulfonic acid, and the quinoxalinecarbonyl chloride is replaced by 5 parts of 3-bromo-6-quinoxalinecarbonyl bromide, a scarlet dye of the following formula is obtained:

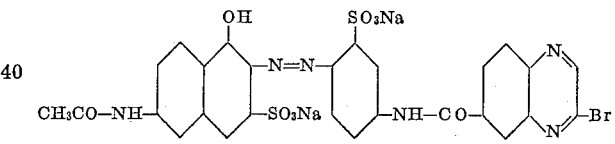

EXAMPLE IX 10 parts of the dye base

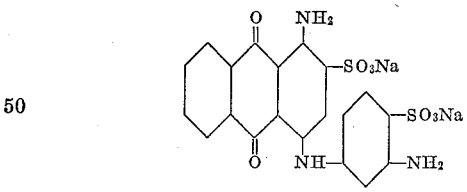

are dissolved in 200 parts of water at pH 6.8 (adjusted with sodium hydroxide) and, with vigorous stirring, 2.3 parts of finely powdered 2-chloro-6-quinoxalinecarbonyl chloride are added. The condensation mass is maintained at 25–30° C. and pH 6.8–7.5 (with sodium bicarbonate) for 3 hours. The solution is then clarified by filtration and salted with 100 parts of sodium chloride. The precipitated dye of the structure

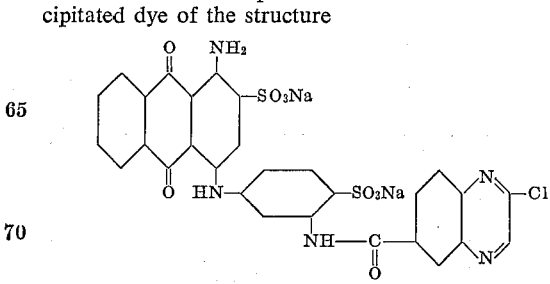

is filtered and dried. When dyed by any of the above-mentioned methods, there result blue dyeings which are fast to light and washing.

EXAMPLE X 5.76 parts of copper phthalocyanine are slowly added below 25° C. to 41 parts of chlorosulfonic acid. The solution is slowly heated to 130° C., and held for 3 hours, cooled, and drowned below 5° C. in an agitated mixture consisting of 100 parts of cold water, 300 parts of ice, and 35 parts of sodium chloride. The solid is then filtered off and washed with 500 parts of 5% sodium chloride solution. This represents copper phthalocyanine polysulfonyl chloride press cake.

This press cake is now slowly added at pH 6 to 6.5 (maintained by the addition of sodium carbonate) to a solution of 4.34 parts of p-phenylene-diamine in 40 parts of water. The turquoise solution is warmed and agitated at 60° C., until the pH remains constant. The reaction mass is then cooled and salted to 20% salt concentration by addition of sodium chloride. The solid is filtered off and washed with 100 parts of 15% salt solution. It constitutes a compound of the formula

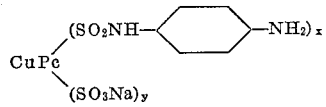

wherein $x$ and $y$ are average numbers of which $x$ is not less than 1, $y$ is not less than 2, and the sum of the two is between 3 and 4, while CuPc represents a molecule of copper phthalocyanine less $(x+y)$ H-atoms.

*Condensation.*—The filter cake obtained above is dissolved in 200 parts of water, the pH is adjusted to about 7.5 to 8 by addition of sodium bicarbonate, the temperature is raised to about 40° to 50° C., and 4.7 parts of 2-chloro-6-quinoxalinecarbonyl chloride are added. The condensation is allowed to proceed for 12 to 15 hours under agitation at said temperature. The solution is salted to 20% sodium chloride. The resulting turquoise dye is filtered off, washed with 50 parts of 20% salt solution and dried.

The dried cake represents a compound of the formula hereinabove, but wherein

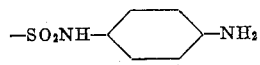

groups have been extended to side-chains of the formula

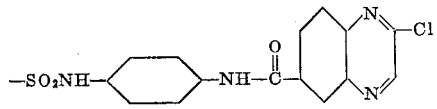

When applied to cotton by the methods outlined above, it affords bright turquoise shades that are fast to washing and to light.

Similar results as in the above example may be obtained by starting with a sulfuric acid-stable metal phthalocyanine, such as nickel or cobalt phthalocyanine, in lieu of copper phthalocyanine. Also, by changing the nature of the diamine selected, the quantity thereof, and the conditions of chlorosulfonation, phthalocyanine compounds of the general formula

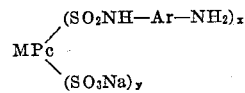

may be obtained and used as initial dye bases for condensation with manohalageno-6-quinoxaline halides. In this formula, $x$ and $y$ are average numbers adding up to between 2 and 4 (each being at least 1); MPc represents a metal phthalocyanine which is stable in the chlorosulfonation reaction for instance, nickel or cobalt phthalocyanine), while Ar may represent miscellaneous substituted phenylene diamines, benzidines, or diaminostilbenes, as typified by the following table:

TABLE 2,5-dimaminobenzene-sulfonic acid;
N-methyl-p-phenylenediamine;
N-2-hydroxyethyl-p-phenylenediamine;
N-2-cyanoethyl-p-phenylenediamine;
N-2-sulfatoethyl-p-phenylenediamine;
5-amino-2-ethylaminobenzene-sulfonic acid;
4,4'-diamino-3,3'-biphenyl-disulfonic acid;
5-amino-2-n-propylamino-benzenesulfonic acid;
4,4'-diamino-2,2'-biphenyl-disulfonic acid.
4,4'-diamino-2,2'-stilbene-disulfonic acid;
m-phenylenediamine;
2,4-diaminobenzene-sulfonic acid;
N-methyl-m-phenylenediamine;
N-(2-hydroxyethyl)-m-phenylenediamine;
N-isobutyl-m-phenylenediamine;
4-amino-2-methylamino-benzenesulfonic acid;
4-amino-2-n-butylamino-benzenesulfonic acid;
toluene-2,5-diamine;
toluene-2,4-diamine.

Similar results are obtained further by using in lieu of the sulfamido - arylamino - substituted phthalocyanines above formulated, phthalocyanine compounds which bear amino groups on an aliphatic side-chain, for instance the compound

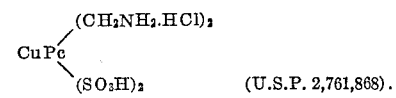

(U.S.P. 2,761,868).

Additional dyes applicable in the present invention are obtained by employing other dye bases in condensation with 2 (or 3)-halogeno-6-quinoxalinecarbonyl halide according to the procedures described in the above examples. For instance, the dye base used in Examples IV and V may be replaced by equimolar proportions of any of the following dye bases:

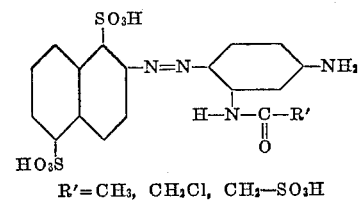

R'=CH₃, CH₂Cl, CH₂—SO₃H

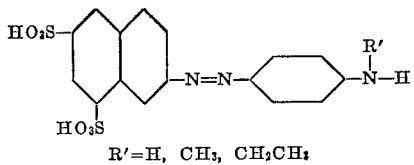

R'=H, CH₃, CH₂CH₃

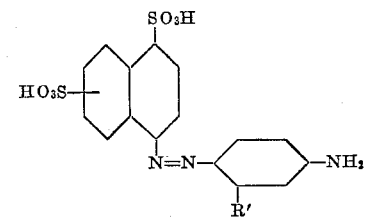

R'=H, CH₃, Cl, N—C—CH₃
              |   ||
              H   O

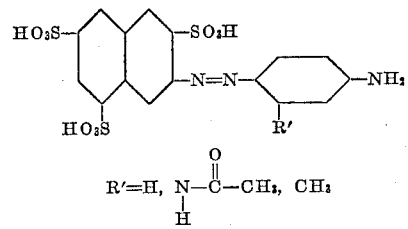

R'=H, N—C—CH₃, CH₃
     |  ||
     H  O

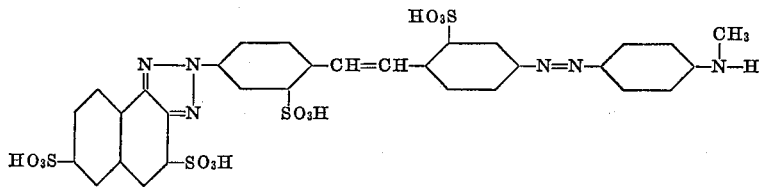

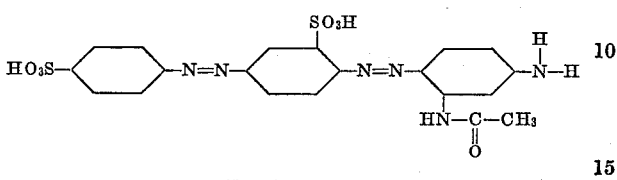

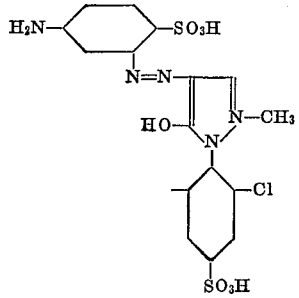

Moreover, in place of the pyrazalone coupler used in preparing the last-mentioned azo dye base, one could use the following couplers:

(1)

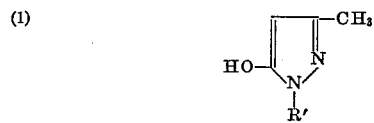

wherein

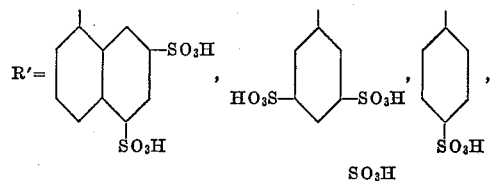

(2)

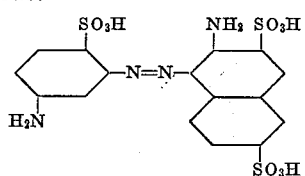

Additional dye bases useful in the invention are illustrated as follows:

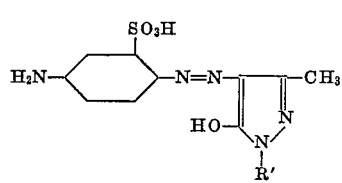

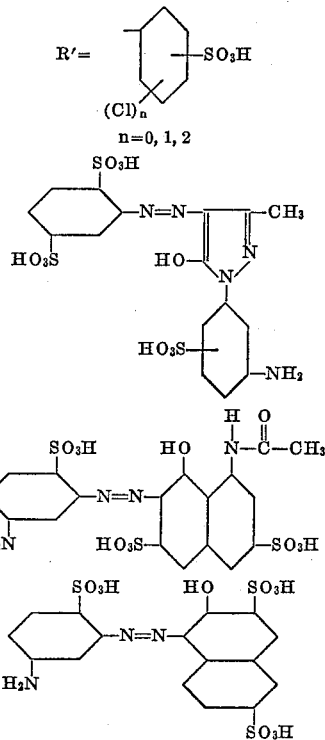

In Example VI, either the coupler or the diazo component or both may be changed. For instance, the 8-amino-1-naphthol-3,6-disulfonic acid used in Example VI may be replaced with equimolar amounts of

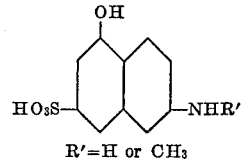

R′=H or CH₃

Moreover, a dye can be formed according to the procedure of Example VI if the orthanilic acid is replaced with equimolar amounts of

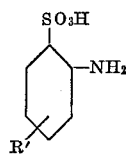

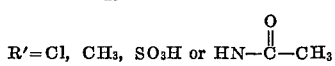

In Example VI the dye base is formed by coupling acetyl H acid (8-amino-1-naphthol-3,6-disulfonic acid) with orthanilic acid. In place of this dye base, one can use equimolar proportions of the following dye bases:

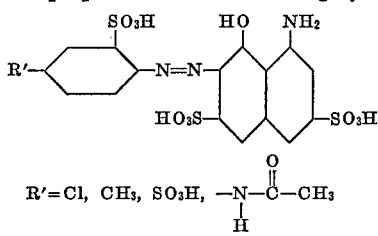

11
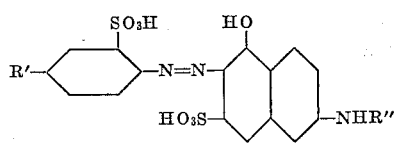
R'=Same as immediately above
R''=H, CH₃, CH₂CH₃, CH₂CH₂OH, CH₂CH₂OSO₃H, CH₂CH₂CN
12
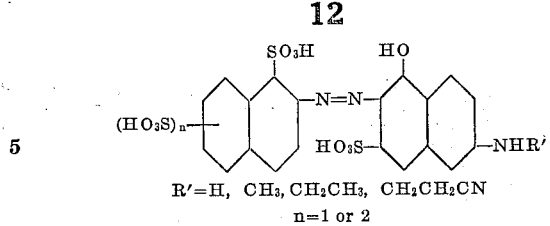
R'=H, CH₃, CH₂CH₃, CH₂CH₂CN
n=1 or 2
In lieu of the azo dye bases mentioned above, one may employ metallized azo dye bases prepared from the azo dye bases and metals listed below:
| Azo Dye Base | Metallized with— |
|---|---|
| | Cu or Co |
| | Cu or Cr |
| | Cu |
| | Cu |
| | Cu |
| | Cu or Co or Cr |
| | Cu |

| Azo Dye Base | Metallized with— |
|---|---|
| ![structure] H₂N—[naphthalene with SO₃H, OH]—N=N—[naphthalene with HO, NH₂, SO₃H, HO₃S, SO₃H] | Cu |

Example IX has been presented to show the preparation of a quinoxaline fiber-reactive dye from an anthraquinone dye base. Substitutions can also be made for the anthraquinone dye base of Example IX. The following anthraquinone components and diamine components can be condensed interchangeably to form dye bases which may be used in place of the dye base which is specified in Example IX:

| Anthraquinone Component | Diamine Component |
|---|---|
| [anthraquinone with NH₂, SO₃H, Br] | HO₃S—[benzene]—NHR', H₂N<br>R'=CH₃, CH₂CH₂OH, CH₂CH₂CN |
| [anthraquinone with NH₂, SO₃H, HO₃S, Br] | H₂N—[benzene with SO₃H]—NHR'<br>R'=H, CH₃, CH₂CH₃, CH₂CH₂CH₃, CH₂CH₂OH, CHCH₃/CH₃ |
| [anthraquinone with NH₂, SO₃H, HO₃S, Br] | HO₃S—[benzene]—NH₂, R'NH<br>R'=H, CH₃, CH₂CH₂OH, CH₂CH₂CN |
| [anthraquinone with NH₂, SO₃H, HO₃S, Br] | HO₃S—[benzene with CH₃]—NH₂, H₂N |
| [anthraquinone with HO₂S, NH₂, SO₃H, Br] | R'—[benzene]—NH₂, H₂N<br>R'=CH₃, Cl, H |

The preparation of a phthalocyanine dye base has been illustrated in Example X. Typical phthalocyanine dye bases which are useful in this example are prepared by reacting a metal phthalocyanine tri- or tetrasulfonyl chloride wherein the sulfo groups are in the 3, 4 or 3 and 4 positions and the metal is Cu, Ni, or Co, with a diamine in the presence of a monoamine. The diamine used most frequently is

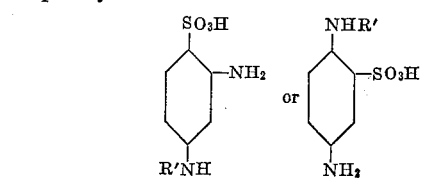

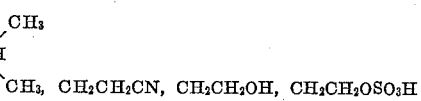

$R'=H, CH_3, CH(CH_3)_2, CH_2CH_2CN, CH_2CH_2OH, CH_2CH_2OSO_3H$

The following examples illustrate the dyeing of fibers with the quinoxaline dyes of this invention:

EXAMPLE XI.—TWO-PAD PROCEDURE

Cotton fabric is added, at 50% pickup (increase in weight of fiber is 50%), with an aqueous solution which contains 4% by weight of the dye (for instance, that obtained in Example IV) and 20% by weight of urea. The fabric is dried at ambient temperature, padded with a 0.75% solution of sodium hydroxide at 50% pickup, and then steamed for 30 seconds. The dyed fabric is rinsed with hot water, scoured with a hot soap solution, rinsed again in hot water, and dried.

EXAMPLE XII.—ONE-PAD PROCEDURE

Cotton fabric is padded, at 50% pickup, with an aqueous solution of a dye of this invention (4% by weight), urea (20% by weight), and sodium carbonate (1.5% by weight). The padding is cured by heating the wet fabric at 325° F. for 1 minute, thereafter cooled, rinsed, scoured, rinsed, and dried.

The above procedure may be modified by replacing the wet heating at 325° F. by one of the following procedures:

(a) steaming for 15 seconds or more,
(b) drying and heating at 300° to 425° F. for 30 seconds or more,
(c) rolling up the fabric and allowing it to stand at room temperature.

EXAMPLE XIII.—EXHAUST PROCEDURE

One part of cotton fabric is added to 25 parts of an 0.08% aqueous solution of the selected dye (say, the dye of Example VI). The dyebath is then heated to 175° F. over a 10-minute period, and 1.25 parts of sodium chloride are added. After a 20-minute period at 175° F., 0.0375 part of trisodium phosphate is added. The dyeing is complete after an additonal 30 minutes at 175° F. The dyed cotton is then rinsed and scoured as described in Example XI.

EXAMPLE XIV.—PRINTING

The cotton fiber is printed locally with a printing paste containing the dye, a thickener, and an acid binding agent, dried, heated for 5 minutes at 100° C., rinsed, scoured, rinsed, and dried.

One of the advantages of the monohalogeno dyes of this invention is ready water solubility. This solubility affords greater flexibility to the dye manufacturer and to the dye consumer. As a result of this invention, the dye manufacturer now has a greater selection of dye bases for use in the fiber-reactive dyes since in this invention one can utilize the lower sulfonated dye intermediates which, in general, are more readily obtained in pure form. Furthermore, the novel dyes exhibit good stability to hydrolysis. This stability permits greater freedom in application, especially those applications in which a strong acid acceptor and dye are present in the same bath or printing paste.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A fiber-reactive dye of the formula

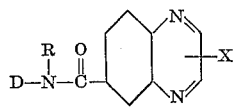

where D is the radical of a water-soluble dye chromophore selected from the group consisting of azo, metallized azo, and acid-anthraquinone, dye chromophores, which is attached to the N-atom by cyclic substitution, and R is selected from the group consisting of hydrogen, lower alkyl, 2-hydroxyethyl, 2-cyanoethyl, and 2-sulfatoethyl radical, and X is selected from the group consisting of chlorine and bromine.

2. A fiber-reactive dye of the formula

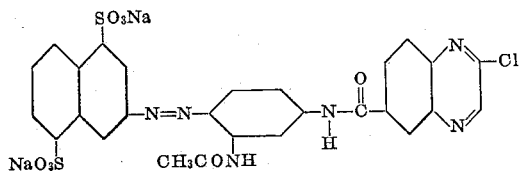

3. A fiber-reactive dye of the formula

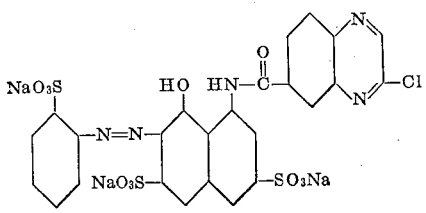

4. A fiber-reactive dye of the formula

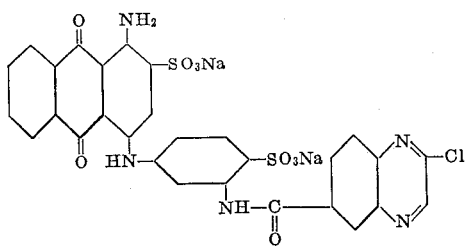

References Cited

UNITED STATES PATENTS 3,232,931  2/1966  Rothman _____ 260—314.5

FOREIGN PATENTS 315,451  7/1929  Great Britain.

OTHER REFERENCES

Siegel et al.: 62–241, May 5, 1962 (Republic of South Africa) (71 pages).

CHARLES B. PARKER, *Primary Examiner.*

R. J. FINNEGAN, D. M. PAPUGA, *Assistant Examiners.*